United States Patent [19]

Lessi et al.

[11] Patent Number: 5,014,440
[45] Date of Patent: May 14, 1991

[54] DEVICE AND METHOD FOR MEASURING THE DEFORMATIONS OF A SAMPLE

[75] Inventors: Jacques Lessi, Maule; Philippe Perreau; Daniel Bary, both of Rueil Malmaison; Guy Grard, Argenteuil, all of France

[73] Assignee: Institut Francais du Petrole, Rueil Malmaison, France

[21] Appl. No.: 213,139

[22] Filed: Jun. 29, 1988

[30] Foreign Application Priority Data

Jun. 30, 1987 [FR] France .............................. 8709265

[51] Int. Cl.$^5$ ..................... G01B 5/02; G01B 5/30; G01B 3/00
[52] U.S. Cl. ...................... 33/557; 33/552; 33/558; 33/560; 33/783; 33/555.2
[58] Field of Search ............... 33/552, 556, 557, 558, 33/560, 703, 704, 783, 803, 805, 178 R, 178 E, 555.1, 552.2, 544.3

[56] References Cited

U.S. PATENT DOCUMENTS

| | | | |
|---|---|---|---|
| 2,496,212 | 1/1950 | Holt | 33/178 R |
| 3,010,212 | 11/1961 | Kinley | 33/178 E |
| 3,273,251 | 9/1966 | Saizon | 33/552 |
| 3,769,713 | 11/1973 | Norman | 33/783 |
| 4,240,206 | 12/1980 | Baresh et al. | 33/556 |
| 4,587,739 | 5/1986 | Holcomb et al. | 33/783 |
| 4,592,149 | 6/1986 | Long | 33/557 |

FOREIGN PATENT DOCUMENTS 712539 7/1954 United Kingdom .................. 33/556

Primary Examiner—William A. Cuchlinski, Jr.
Assistant Examiner—Diego F. F. Gutierrez
Attorney, Agent, or Firm—Antonelli, Terry, Stout & Kraus

[57] ABSTRACT

A device and method are provided for measuring the deformations of a sample, with the deformations resulting more particularly from the relaxation of the stresses to which the samples were subjected prior to the measurement, and with the sample having an axis corresponding to a main deformation direction. The device comprises at least five displacement sensors each having a measurement direction, with the measurement directions being substantially perpendicular to the axis of the sample.

17 Claims, 2 Drawing Sheets

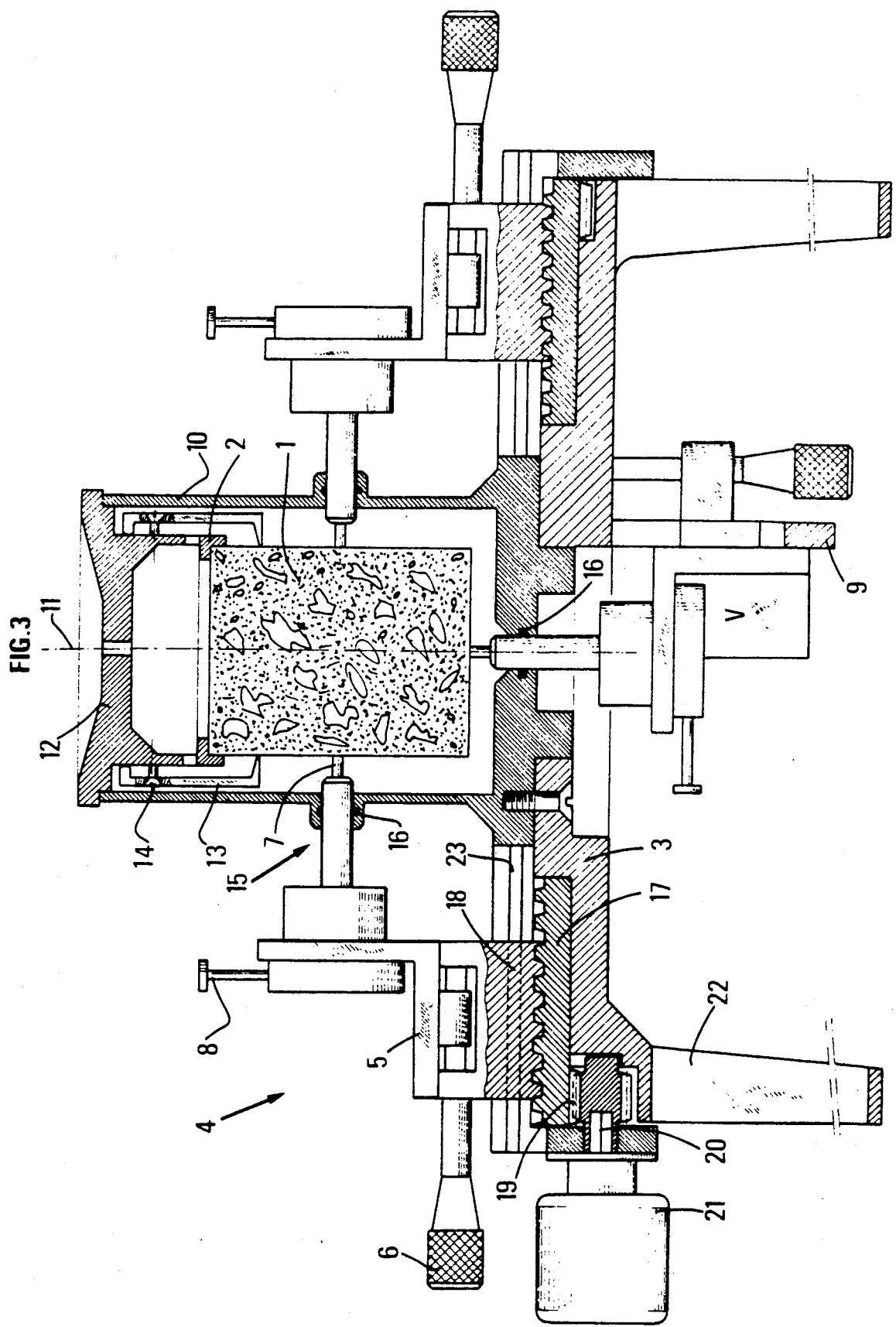

DEVICE AND METHOD FOR MEASURING THE DEFORMATIONS OF A SAMPLE

BACKGROUND OF THE INVENTION

The present invention relates to an apparatus and a method for measuring, in several directions, the deformations of core samples taken from geological formations, the deformations resulting more particularly from the relaxation of the stresses which were exerted on these cores before it was taken.

FIELD OF THE INVENTION

The present invention makes it possible in particular to determine the tensors of stresses and/or deformations and in particular the direction of the minimum horizontal compression stress. The knowledge of this minimum horizontal compression stress, applied to mining, oil or gas production, particularly in low permeability formations, makes it possible to define the plane of propagation of hydraulic fractures which are perpendicular thereto.

By determining this stress from several core samples taken at different places in a geological formation, it is possible to determine the optimum position of the well or boreholes for improving the production of a field under development.

By permeability is meant the property of the inner spaces of a rock to communicate together, which makes it possible for the fluids which they contain to move through the rock in question.

DESCRIPTION OF THE PRIOR ART

One way of knowing the condition of the stresses and/or deformations and/or a plane of propagation comprises taking a rock sample from the geological formation concerned, and measuring the deformations in the rock or core sample resulting from the substantially instantaneous relaxation of the stresses in situ.

Once the sample has been taken from the formation, the latter first of all undergoes instantaneous and considerable deformations which are only accessible to measurement if this measurement is made at the bottom of the well just at the time the sample is taken.

These instantaneous deformations are succeeded, for several tens of hours, by delayed deformations whose order of size is smaller than that of the instantaneous deformations, and which may, for example, be observed once the core sample has been raised to the surface of the ground, as may be the case in oil drilling.

One method, called relaxation, includes measuring the delayed deformations of a core sample in several directions, deriving therefrom the set of deformations and their evolution time and, consequently, to know the stresses to which the formation considered is subjected.

If, for the sake of facility, these measurements are made on cylindrical core samples and if the axis of the core sample is considered as one of the main deformation directions (a simplifying assumption, justified when the core samples are taken from vertical wells or taken perpendicularly to the stratification), four independent directions (one parallel to the axis of the sample and three in a plane perpendicular to this axis) are sufficient for determining with a rheological model, such as those presented by Blanton and Warpinsky, the deformations of a core sample, their evolution in time and the stresses of the formation studied.

However, because particularly of the very low value of the deformations measured (a few micrometers) and because very often of the operating conditions for obtaining these latter (vibrations of the site, wind, . . . producing parasite movements), and also because of the device for acquiring these measurements, the measurements of the deformations, like the deductions made therefrom, are erroneous.

SUMMARY OF THE INVENTION

Thus, to overcome this drawback, among others, the present invention provides a device for measuring the deformations of a sample, these deformations resulting more particularly from the relaxation of the stresses to which the sample was previously subjected, with the sample having an axis corresponding substantially to a main deformation direction.

This device is characterized particularly in that it comprises at least five displacement sensors each having a measurement direction, with the measurement directions being substantially perpendicular to said axis of the sample.

When an axis and a direction are not included in the same plane, they will be considered as perpendicular when the angle formed between the axis and the parallel to the direction intersecting the axis is a right angle.

The measurement directions perpendicular to the axis of the sample may be convergent with the axis of the sample.

The device may comprises six displacement sensors each having a measurement direction, with the measurement directions being independent of each other and substantially perpendicular to the axis of the sample, and with the six sensors being associated in pairs, so that the directions of the sensors of each pair are substantially included in the same axial plane and diametrically opposite to each other with respect to the sample.

The device may comprise a table on which the sample is disposed perpendicularly, and may further comprise at least one sensor whose measurement direction is substantially parallel to the axis of the sample.

The device may comprise centering means adapted for maintaining the sample substantially fixed with respect to the sensors.

The sample may have a cylindrical form of revolution and the axis of the cylindrical form may correspond substantially to the main deformation direction.

The present invention further provides a method for measuring deformations and such movements of a sample by means of a device, with the deformations resulting from relaxation of the stresses to which the sample was previously subjected. The said movements are those of the sample relatively to the measuring device, with the sample having an axis corresponding to a main deformation direction. This method is more particularly characterized in that the displacements of the surface of the sample are measured along the axis of the sample and along at least five directions substantially perpendicular to the axis, with these displacements resulting more particularly from the deformations and movements.

At least two pairs of two directions may be formed in the five directions, with the two directions of each pair being substantially included in the same axial plane and diametrically opposite each other with respect to the sample.

The displacements may be measured in six independent directions substantially perpendicular to the axis and the six directions may be associated in twos so as to form three pairs of directions, with the two directions of each pair being substantially included in the same axial plane and diametrically opposite with respect to the sample.

The three pairs of directions may define, with the axis of sample, respectively three axial measurement planes and these three axial measurement planes may be disposed with respect to each other forming an angle substantially equal to 120°.

The sample may have a cylindrical form of revolution and the axis of the cylindrical form may correspond substantially to the main deformation direction. The directions may be substantially included in the same plane.

The sample may be placed on a table, with the axis of the sample being perpendicular to the table and the displacements of the sample being measured along its axis, on the face of the sample opposite that placed on the table.

With the displacements measured by the sensors, each of the pairs of directions are substantially coaxial to an analysis axis and the algebraic sum of the values of the displacements measured along each of the pairs of directions may be made so as to derive therefrom the deformation of the sample along each analysis axis.

A simultaneous displacement of the sensors may be caused whose direction is substantially perpendicular to the axis of the sample so that the sensors reach their measurement position substantially simultaneously.

The device and/or the method may be used for determining the deformations of a geological sample, such as a core sample taken from a borehole in the ground.

BRIEF DESCRIPTION OF THE DRAWINGS

The invention will be well understood and all its advantages will be clear from the following description, one embodiment of which is illustrated in the accompanying drawings wherein:

FIG. 3 is a partially schematic cross-sectional view of another embodiment of a measuring device of the present invention.

DESCRIPTION OF THE PREFERRED EMBODIMENTS

Figure 1:
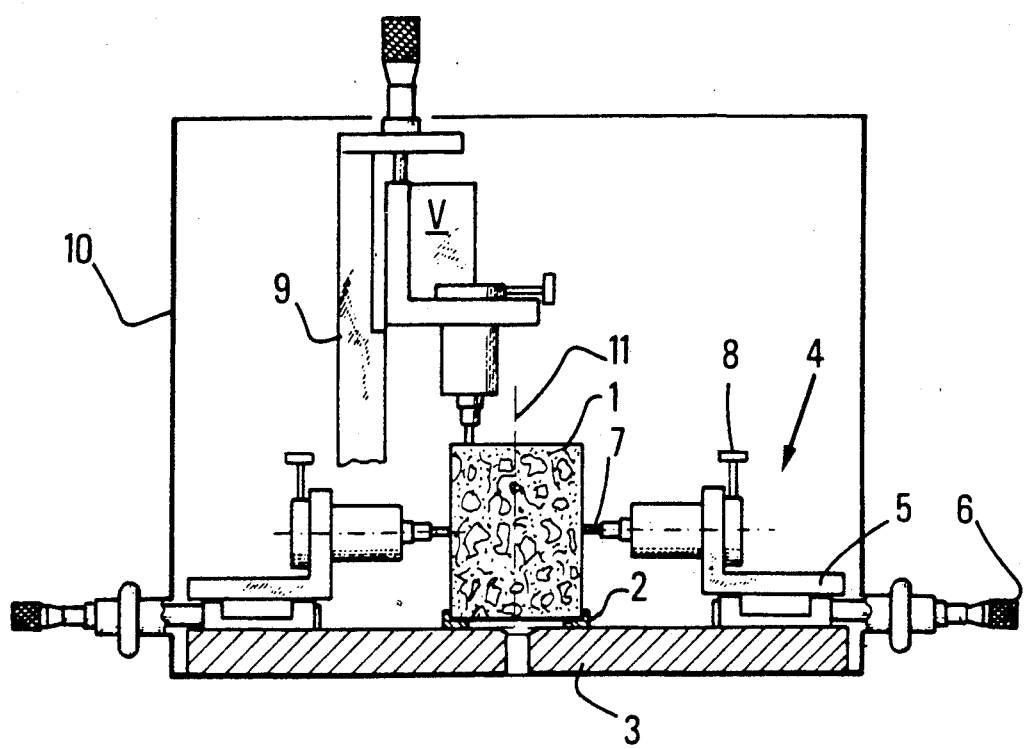
FIG. 1 is a partially schematic cross-sectional view of a measuring device of the present invention.

Referring now to the drawings wherein like reference numerals are used throughout the various views to designate like parts and, more particularly, to FIG. 1, according to this figure, a sample 1, such as a geological core sample, whose deformations due to relaxation of the stresses are to be measured is held by centering means 2 on a table 3, so that the sample 1 has the least possible movement with respect to the displacement sensor supports 4 and brackets 5 or the displacement sensors 7.

In fact, particularly in mining worksites, the conditions for carrying out such measurements are relatively severe and although the sample 1 is held substantially fixed, there still remains the possibility of parasite micro-movements of the sample which must be reduced.

The displacement sensor 7 is fixed to support 4 which may be moved with respect to table 3 by an approach or coarse adjustment screw 8 and a micrometric screw 6.

In the embodiment to which the present description relates, the sample 1 is a mining core sample and has a cylindrical form of revolution. Axis 11 of this core sample 1 corresponds to a main deformation direction 11 known in the art of the mechanics of solids.

Axis 11 of the sample 1 is placed perpendicularly to the plane of table 3. The device comprises six horizontal displacement sensors 7 designated P, $P_1$, Q, $Q_1$, R, $R_1$ (FIG. 2) having a measurement direction converging with the axis 11 and perpendicular to axis 11 of sample 1. The device further comprises a vertical displacement sensor V (FIG. 1) mounted on a bracket 9 along a measurement axis parallel to the axis 11 of the sample 1.

The six horizontal sensors plus one vertical displacement sensor may be induction sensors operating with a current of 5 KHz and may have a resolution of 0.01 micrometer.

The six horizontal sensors are associated in pairs (P, $P_1$), (Q, $Q_1$), (R, $R_1$), so that the directions of the sensors are included substantially in an axial plane of the sample 1 and are diametrically opposite to each other with respect to the sample 1. The three pairs of directions thus formed with the axis 11 of the sample 1, define three axial measurement planes. These axial planes are disposed with respect to each other spaced apart by an angle substantially equal to 120°. The axes of the six horizontal sensors P, $P_1$, Q, $Q_1$, R, $R_1$ are situated in the same plane perpendicular to the axis of the sample.

By forming pairs of measurement directions, it is very easy to detect and evaluate the slight accidental movements with respect to table 3.

With such an arrangement of the measurement directions of the horizontal sensors, or axis of the sensors, each pair of directions is coaxial to an analysis axis along which the deformations of the sample are easy to be obtained with accuracy, from the algebraic sum of the displacement values measured along each of the pairs of directions.

Thus, knowing the deformations of the sample along three analysis axes, and using a rheological model, such as those presented by Blanton and Warpinsky, it is possible to know the tensor of the deformations of the sample, to follow their evolution in time and consequently to determine the tensor of the initial stresses of the sample, or else the state of the stresses of the geological formation from which the sample comes.

Although the preferred embodiment described comprises six horizontal sensors P, $P_1$, Q, $Q_1$, R, $R_1$, the number of such sensors may be reduced to five. In fact, knowing it is necessary to have five independent measurements for calculating the five unknowns (three unknowns relative to the deformations of the sample, two unknowns relative to the displacements of the sample with respect to the sensor), it is possible to use only five sensors having independent measurement directions.

By measurement directions independent of each other is meant the measurements made in these directions which make it possible to make the above-mentioned calculation. One set of such directions is given more particularly by directions convergent to the axis of the sample and which are not substantially included in the same half-plane delimited by the axis of the sample and defined by this axis and the point of contact of the sensor with the sample.

In order to more easily calculate the horizontal movement unknowns, at least two pairs of independent measurement directions may be formed so as to readily know the deformations along the analysis axis parallel to these pairs of directions and included in the plane of these pairs of directions.

The sample may have another form than the preferred cylindrical form of revolution. Thus, the axis of the sample will be defined as being a main deformation axis.

Preferably, the horizontal measurement directions are situated in the same plane perpendicular to the main deformation axis of the sample, but these directions may be very well placed in different planes perpendicular to said axis.

The deformation measurement device further comprises a cell 10 external to the sensors and to sample 1. This cell 10 is filled with a thermal mass for reducing the temperature variations of the sample and/or of mounting, and/or for limiting the fluid saturation variations of a sample impregnated with fluid.

It is known to carry out the measurements of the deformations resulting from relaxation of the stresses in air. For that, the measurement device is placed, for example, in an oven whose temperature is regulated to 25° C.±0.1° C. In this case, the choice of the regulation temperature which is situated above the ambient temperature is established so that the thermal losses of the device are always positive during the measurement time and this at any season of the year. This type of means for regulating the temperature does not necessarily comprise a cold source.

However, for example, when the sample is a geological core sample, the surface of the sample like its mass is very often not at the temperature of the device when it is to be placed in the device. The result then is a certain delay for the sample to reach the temperature of the measurement device and beyond which the measurements are valid.

When, for example, the thermal mass is air regulated to 25° C. and when the sample is at a temperature of 10 or 15° C., it is indispensable to wait for several hours, even several tens of hours, before being able to validate the measurements.

However, the knowledge of the evolution in time of the deformations, as soon as possible after taking the sample, or from the beginning of relaxation of the stresses, makes it possible to improve the quality of the interpretations of the measurements.

Thus, by replacing the thermal air mass by a thermal mass of sufficient volume having more particularly a heat capacity and/or thermal conductibility greater than that of air under normal temperature and pressure conditions, it is possible to reduce the warming up time of the sample and thus to improve the quality of the measurements and their interpretation.

Tests using a device placed in an oven and a liquid thermal mass formed of vaseline oil, have shown that it was necessary to wait only for 160 minutes, after immersion of the sample, initially at a temperature close to 10° C., for this latter to reach the temperature of the bath formed by the thermal mass.

This time is estimated by continuously observing the temperature of the bath which shows a cooling (corresponding to warming up of the sample) before balance is reached and, only once balance is reached, a heating of the bath produced by the single hot source of the regulation means.

Once the sample is at the temperature of the bath, i.e. once its temperature is uniform, it is possible to make thermal deformation corrections by knowing the thermal expansion coefficient. The value of this coefficient may be obtained by varying the temperature of the sample once relaxed and measuring the deformations then produced solely by the temperature. If not, during measurements of the deformations due to relaxation, the deformations due to expansion would mask the deformations resulting from relaxation.

This thermal mass with improved thermal inertia, which may be formed of water, oil, mercury, a gel, a powder . . . , further makes it possible to stabilize the temperature of the device which, although made from a material with a low expansion coefficient such as INVAR (a registered trade mark for an alloy containing 64% iron, 36% nickel and having an expansion coefficient of $0.5 \cdot 10^{-6°}$ C.$^{-1}$), is likely to introduce parasite thermal deformations.

The thermal mass used may be selected, not only for its thermal qualities, but also for its capacity not to dry out or impregnate the sample measured. In fact, when the sample is solid, has certain porosity and is impregnated by a fluid, such as that of the geological formation from which the sample comes, the fluid concentration variations of the sample, like the penetration by another fluid, causes modifications of the internal stresses, particularly during relaxation. The modifications of the internal stresses result in modifications of the measured deformations and so an alteration of the deformation measurements.

Thus, by using a thermal mass which neither dries out nor impregnates the sample, the deformations relative to these effects are cancelled out and no correction due to the fluid concentration variation of the sample is required.

If the thermal mass risks drying and/or impregnating a sample previously impregnated with fluid, the sample may comprise an external waterproofing film, adapted so as to prevent the modification of the impregnation fluid concentration and/or introduction of the thermal mass in the sample.

When the sample is a water impregnated geological core sample and when the thermal mass comprises water, the sample may comprise a film adapted for preventing the possible migration of a salt present in the sample.

Another way of determining the validity of the measurements of deformation of a sample consists in using two temperature sensors. The first of these two sensors is situated at a first distance from the sample less than a second distance from the sample where the second temperature sensor is situated.

For example, the first sensor may be placed on the sample and the second sensor at 1 or 2 cm from the sample in the thermal mass. With this arrangement of the sensors and using the temperature values taken by these sensors, a thermal gradient existing in the thermal mass may then be determined for example using comparison means and consequently the moment when the thermal balance is reached and when the deformation measurements are valid (from this moment the temperature of the sample is known.

During the deformation measurements, slight reference temperature variations of the cell, which introduce disturbances into the deformation measurements, may then be corrected if relationships are established between deformations and temperature by calibrating the mounting and sample assembly. This calibration may be obtained by imposing a temperature variation at the end of the test, when the deformations resulting from the relaxation of the stresses have become negligible.

To better evaluate the temperature distribution in the sample, movements of the thermal mass may be avoided.

As a function of this thermal gradient, means may be controlled for regulating the temperature of the thermal mass, such as a cold source and/or a hot source, such regulation being effective particularly in the vicinity of the sample.

In FIG. 3, the supports 4 of the horizontal displacement sensors 7, bracket 5, the approach 8 and micrometric 6 screws are disposed outside cell 10. The sample is centered in cell 10 by centering means 2 fixed to a lid 12 of the cell. The sample 1 is held on the lid 12 by claws 13 tightened by screws 14.

The horizontal sensors 7 penetrate through the cylindrical wall of the cell 10 through circular orifices 15 whose edges are provided with sealing means 16 cooperating with the six sensors 7 for preventing the fluid in cell 10 from leaving it.

The six-supports 4 of the horizontal sensors 7 are mounted in slides 23 on the table 3 and synchronized for translational movement by means providing rapid and equal approach of the sensors so that they reach their measurment position substantially simultaneously, and thus reducing the time for adjusting the position of the sensors once the sample 1 is placed in cell 10, the diameter of the samples possibly varying considerably from each other.

These synchronous means for translatory advance of sensors 7 comprise, for example, a crown wheel 17, rotating about axis 11. The crown 17 has on its upper face a spiral which cooperates with a locally complementary form 18 secured to each of supports 4 or sensor 7 so as to provide a translatory movement of the supports, and on its lower face, peripheral teeth 19 which cooperate with a pinion 20 driven by an electric motor 21 for causing rotation of the ring in one direction or in the opposite direction and thus forward or backward movement of sensor 7.

Figure 2:
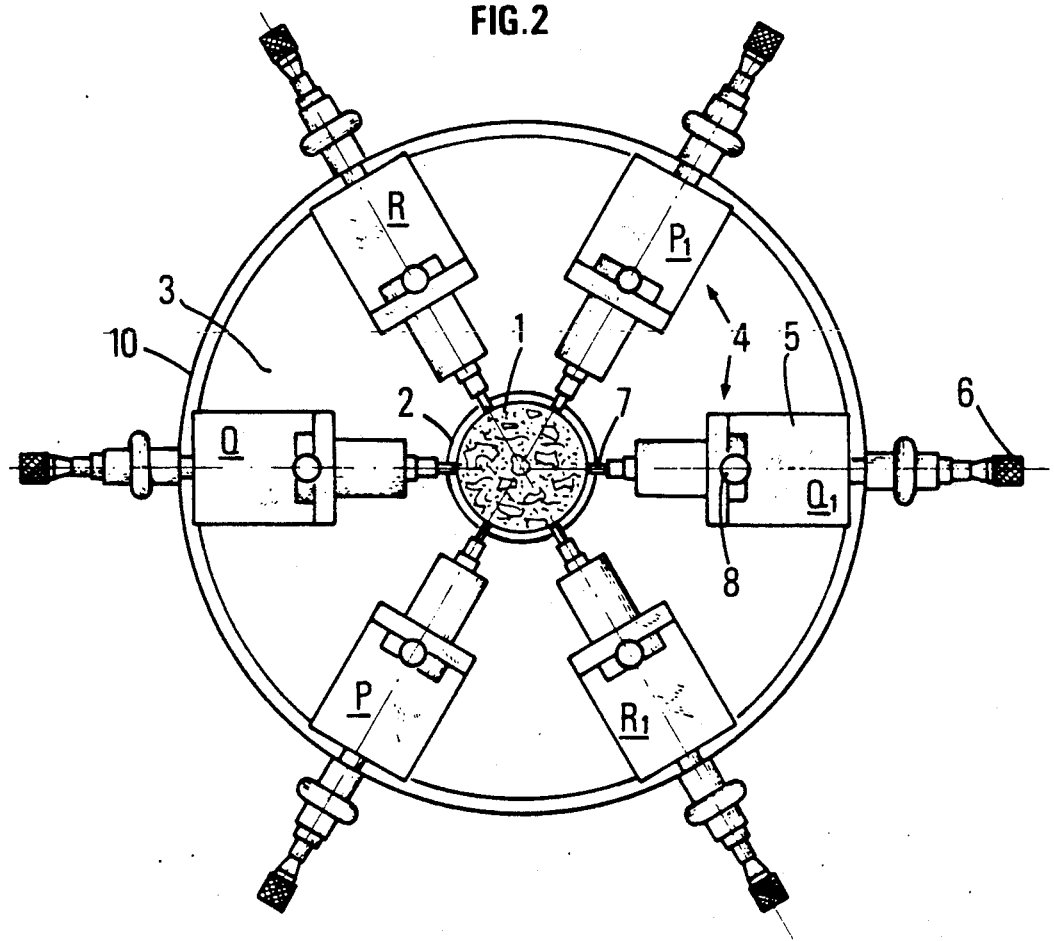
FIG. 2 is a top view of the measuring device of FIG. 1.

Contrary to the device shown in FIGS. 1 and 2, the vertical displacement sensor V, bracket 9 and the associated approach screw are disposed below table 3 so that the touch of the vertical sensor V bears on the lower face of the sample substantially in the axis thereof.

Sealing means 16 prevent the fluid forming the thermal mass from escaping through the annular space separating table 3 from the vertical sensor V.

The device further comprises feet 22 for seating it on a measurement space.

The embodiment of FIG. 3 is particularly well adapted to the use of mercury as thermal mass. Since the thermal conductivity of mercury is relatively very high, for example with respect to that of water or oil, the time required for warming up the sample is consequently reduced. Adapted heating means make it possible to obtain a rapid balance of the temperatures of the sample. Mercury also offers the advantage of not drying or impregnating a good number of rock samples and thus does not require waterproofing thereof, which makes possible a substantially non delayed measurement.

Furthermore, the arrangement of the sensors and of the cell makes it possible to rapidly position the sample and sensors and thus rapidly obtain the measurements. Furthermore, the fluid forming the thermal mass may remain in the cell between the measurements of several consecutive samples which avoids handling and increases the safety in positioning particularly when using fluids such as mercury which requires special precautions.

What is claimed is:

1. A device for measuring deformations of a sample, said deformations resulting from a relaxation of stresses to which the sample was subjected prior to a measurement, the sample having an axis corresponding to a main deformation direction, the device comprising at least five displacement sensor means for sensing a movement of the sample, and means for mounting the displacement sensor means so as to have a measurement direction, and wherein the measurement directions of said at least five displacement sensor means are substantially perpendicular to said axis of the sample.

2. The device as claimed in claim 1, wherein said measurement directions perpendicular to the axis of the sample are convergent with the axis of the sample.

3. The device as claimed in one of claims 1 or 2, wherein the number of displacement sensor means is six, each of said six displacement sensor means having a measurement direction, the measurement directions being independent of each other and substantially perpendicular to said axis of the sample, and wherein said six displacement sensor means are associated in pairs so that the measurement directions of the sensor means of each pair are substantially included in a same axial plane and diametrically opposite to each other with respect to the sample.

4. The device as claimed in one of claims 1 or 2, comprising table means on which the sample is disposed perpendicularly, and wherein at least one additional sensor means is provided having a measurement direction substantially parallel to the axis of the sample.

5. The device as claimed in claim 4, further comprising centering means for maintaining the sample substantially fixed with respect to the sensor means.

6. The device as claimed in claim 5, wherein said sample has a cylindrical form of revolution and an axis of the cylindrical form corresponds substantially to said main deformation direction.

7. The device as claimed in claim 4, wherein said additional sensor means is disposed below said table means.

8. A method of measuring deformations and movements of a sample, said deformations resulting from a relaxation of stresses to which the sample was subjected prior to a measurement, and the sample having an axis corresponding to a main deformation direction, the method comprising the steps of providing a measurement device with respect to which the movements of the sample are to be measured, and measuring displacements of a surface of the sample along at least five directions substantially perpendicular to said axis, said displacements of the surface resulting from said deformations and said movements.

9. The method as claimed in claim 8, further comprising the step of arranging the five directions in at least two pairs, with each pair of directions being substantially included in the same axial plane and diametrically opposite to each other with respect to the sample.

10. The method as claimed in one of claims 8 or 9, wherein the step of measuring includes measuring the displacements along six independent directions substantially perpendicular to said axis, and arranging said six directions so as to form three pairs of directions, with each pair of directions being substantially included in the same axial plane and diametrically opposite with respect to the sample.

11. The method as claimed in claim 10, wherein the three pairs of directions define with the axis of the sample respectively three axial measurement planes and the three measurement planes are separated from each other by an angle substantially equal to 120 degrees.

12. The method as claimed in claim 11, wherein said sample has a cylindrical form of revolution and an axis of the cylindrical form corresponds substantially to said main deformation direction.

13. The method as claimed in claim 8, wherein said directions are substantially included in the same plane.

14. The method as claimed in claim 10, wherein the step of providing a measurement device includes providing a table and placing the sample on the table with the axis of the sample perpendicular to the table, and wherein the step of measuring includes measuring the displacements of the sample along its axis on a face of the sample opposite a face placed on said table.

15. The method as claimed in claim 14, wherein the measuring device includes sensor means, and each of said pairs of directions are substantially coaxial to an analysis axis, and the method further comprises obtaining an algebraic sum of values of the displacements measured along each of the pairs of directions to derive therefrom the deformation of the sample along each analysis axis.

16. The method as claimed in claim 14, comprising simultaneously displacing the sensor means in a direction substantially perpendicular to said axis of the sample so that said sensor means substantially simultaneously reach measurement positions.

17. The method as claimed in claim 16, for determining deformations of a geological sample.

* * * * *